US010989359B2

(12) United States Patent
Gillia et al.

(10) Patent No.: US 10,989,359 B2
(45) Date of Patent: Apr. 27, 2021

(54) HYDROGEN STORAGE TANK COMPRISING A PLURALITY OF SEALS

(71) Applicant: COMMISSARIAT A L'ENERGIE ATOMIQUE ET AUX ENERGIES ALTERNATIVES, Paris (FR)

(72) Inventors: Olivier Gillia, Sassenage (FR); Albin Chaise, Grenoble (FR); Manon Elie, Grenoble (FR); Marine Ponthieu, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 171 days.

(21) Appl. No.: 16/466,541

(22) PCT Filed: Dec. 5, 2017

(86) PCT No.: PCT/FR2017/053381
§ 371 (c)(1),
(2) Date: Jun. 4, 2019

(87) PCT Pub. No.: WO2018/104644
PCT Pub. Date: Jun. 14, 2018

(65) Prior Publication Data
US 2020/0292132 A1     Sep. 17, 2020

(30) Foreign Application Priority Data
Dec. 6, 2016     (FR) ..................... 16 61982

(51) Int. Cl.
*F17C 11/00*     (2006.01)
(52) U.S. Cl.
CPC .... *F17C 11/005* (2013.01); *F17C 2201/0109* (2013.01); *F17C 2209/22* (2013.01); *F17C 2221/012* (2013.01)

(58) Field of Classification Search
CPC ............ F17C 11/005; F17C 2201/0109; F17C 2209/22; F17C 2221/012; Y02E 60/32
USPC ......................... 206/0.6, 0.7; 96/126; 53/473
See application file for complete search history.

(56) References Cited

U.S. PATENT DOCUMENTS

| 4,667,815 A | * | 5/1987 | Halene .................. F17C 11/005 206/0.7 |
| 6,432,176 B1 | | 8/2002 | Klos et al. |

(Continued)

FOREIGN PATENT DOCUMENTS

| DE | 198 59 654 A1 | 6/2000 |
| FR | 2 953 820 A1 | 6/2011 |

(Continued)

OTHER PUBLICATIONS

International Search Report dated Jan. 22, 2018 in PCT/FR2017/053381 filed on Dec. 5, 2017.

(Continued)

*Primary Examiner* — Luan K Bui
(74) *Attorney, Agent, or Firm* — Oblon, McClelland, Maier & Neustadt, L.L.P.

(57) ABSTRACT

A hydrogen storage tank includes a shell of longitudinal axis, a hydrogen supply and collection duct, and a stack of a plurality of divider elements. Each divider element forms a bottom accepting a hydrogen storage material. The largest transverse dimension of the divider elements is less than the largest transverse dimension of the internal volume of the shell, and the tank includes a plurality of seals in the space formed between the divider element and the shell as a result of the difference in largest transverse dimension.

14 Claims, 2 Drawing Sheets

(56) References Cited

U.S. PATENT DOCUMENTS

| | | | |
|---|---|---|---|
| 8,646,597 B2* | 2/2014 | Yang | F17C 11/005 206/0.7 |
| 2003/0019765 A1* | 1/2003 | Yang | F17C 11/005 206/0.7 |
| 2012/0160712 A1 | 6/2012 | Yang et al. | |
| 2012/0211376 A1* | 8/2012 | Chung | F17C 11/005 206/0.7 |
| 2014/0061066 A1* | 3/2014 | Chung | F17C 11/00 206/0.6 |
| 2015/0260342 A1 | 9/2015 | Elie et al. | |
| 2016/0312956 A1 | 10/2016 | Chaise et al. | |

FOREIGN PATENT DOCUMENTS

| | | |
|---|---|---|
| FR | 2 996 628 A1 | 4/2014 |
| FR | 3 014 999 A1 | 6/2015 |

OTHER PUBLICATIONS

French Preliminary Search Report dated Jun. 16, 2017 in French Application 16 61982 filed on Dec. 6, 2016.

Nasako, K. et al., "Stress on a reaction vessel by the swelling of a hydrogen absorbing alloy," Journal of Alloys and Compounds, vol. 264, 1998, pp. 271-276.

Ao, B. Y. et al., "A study on wall stresses induced by $LaNi_5$ alloy hydrogen absorption-desorption cycles," Journal of Alloys and Compounds, vol. 390, 2005, pp. 122-126.

Lin, C-K. et al., "Effects of cyclic hydriding-dehydriding reactions of $LaNi_5$ on the thin-wall deformation of metal hydride storage vessels with various configurations," Renewable Energy, vol. 48, 2012, pp. 404-410.

Charlas, B. et al., "A tool for modelling the breathing of hydride powder in its container while cyclically absorbing and desorbing hydrogen," International Journal of Hydrogen Energy, vol. 40, 2015, pp. 2283-2294.

\* cited by examiner

HYDROGEN STORAGE TANK COMPRISING A PLURALITY OF SEALS

TECHNICAL FIELD

The present invention relates to the general field of containers for storing hydrogen in hydride form, in particular metal hydrides.

Hydrogen is one of the alternative storable energy carriers that have now been developed for several years. Hydrogen can be obtained in various ways, for example from natural gas or other hydrocarbons, and in particular can be produced by means of the electrolysis of water at high temperature, and in particular electrolysis of steam at high temperature, respectively designated by the terms "high temperature electrolysis" (HTE) and "high temperature steam electrolysis" (HTSE). Hydrogen can furthermore advantageously be used as an energy source in solid oxide fuel cells (normally designated by the acronym SOFC, standing for "solid oxide fuel cells", or in proton exchange membrane fuel cells (or PEM, standing for "proton exchange membranes").

The invention finds applications in various areas of industry, and in particular when there exists a need for hydrogen compression, such as for example for hydrogen gas compressors using hydrides such as for hydrogen service stations. In addition, the invention applies both to hydrogen storage solutions of the stationary type and to the on-board type.

Thus the invention can be used for the on-board storage of hydrogen, for example for a fuel cell or heat engine, for example for transport means, such as boats, submarines, cars, buses, lorries, construction site equipment, two-wheelers, and the like.

Furthermore, the invention can be used in the field of transportable energy supplies such as batteries for portable electronic appliances such as mobile telephones, portable computers and the like.

The invention can also be used for the stationary storage of hydrogen, for example in large quantities, such as for electricity generators, or for the storage of hydrogen produced in large quantities by the electrolysis of water with electricity coming from wind turbines, photovoltaic panels, geothermal energy, and the like.

Finally, the invention can also make it possible to store any other source of hydrogen coming for example from reforming of hydrocarbons or other methods for obtaining hydrogen (photocatalysis, biological, geological, and the like).

Thus the invention proposes a container for the storage of hydrogen by the absorption of hydrogen in a hydrogen-storage material comprising a plurality of seals associated with separation elements, as well as an associated manufacturing method.

PRIOR ART

The storage of hydrogen in a hydride is an exothermal reaction, namely that it releases heat, whereas the release of hydrogen is an endothermic reaction, namely that it absorbs heat.

A significant constraint in the field of the storage and release of hydrogen is being able to best manage the thermal operating modes, for example those of a solid oxide fuel cell (SOFC) or of a high temperature water electrolyser (HTWE).

Thus, in order to be able to manage the endothermic and respectively exothermic aspects of the desorption of hydrogen from the hydride container and respectively of the absorption of hydrogen, the prior art teaches designing hydride containers in the form of vertical cylinders.

However, in order to be able to best manage the mechanical stresses applied to the hydride container, adopting a staged design of such a vertical cylinder is well known, in order to avoid having an excessively deep bed of hydrides. In other words, numerous designs of hydride containers in the form of vertical cylinders provide for the establishment of many separations in the cylinder in order to form a plurality of hydride beds spaced vertically apart from each other.

This is because the technical solutions providing only one hydride bed at the bottom of the vertical cylinder are not viable from a mechanical point of view. The phenomenon of "breathing" of the hydrides when absorbing and desorbing hydrogen, namely a swelling and contraction of the hydrides, causes the appearance of high stresses on the walls of the cylinder, also referred to as the cylinder barrel. As described in the article "Stress on a reaction vessel by the swelling of a hydrogen absorbing alloy", K. Nasako et al, January 1998, Journal of Alloys and Compounds, Volume 264, pages 271-276, these stresses increase with the number of absorption/desorption cycles until they reach the elastic limit of the material, which is unacceptable for a hydrogen storage container.

Various solutions for hydride containers in the form of vertical cylinders with the establishment of multiple separations have therefore been described in the prior art.

By way of example, the French patent application FR 2 953 820 A1 discloses the use of vertical separators in the form of cups, disposed at equal distances by fitting them on a porous hydrogen distribution tube at the same time as in the cylinder barrel. A curved edge creates the flexibility that makes it possible to elastically clamp the cups on the tube or barrel. The device ensures an easy passage of the hydrogen to or from the hydride powder while ensuring confinement of the hydride powder in each cup.

Moreover, the French patent application FR 2 996 628 A1 describes a compartmenting of a hydride container in the form of a vertical cylinder produced by means of cups stacked on a central tube. The central tube consists of an assembly of tube portions, each portion being mounted clamped in a central orifice of each cup. The seal between each cup is provided by the deformation of lips. The hydrogen arrives in each cup since the central tube is porous to hydrogen but not to hydride powder. The device there also ensures easy passage of the hydrogen to or from the hydride powder while ensuring confinement of the hydride powder in each cup.

In addition, the French patent application FR 3 014 999 A1 teaches the implementation of compartmenting by means of stacked cups. The hydrogen enters through a filter incorporated in the walls of the cup, and a seal by nesting and O-ring seal is achieved between each of the cups.

Thus various hydride container design solutions in the form of vertical cylinders with separation elements have already been envisaged by the prior art starting from the principle that, in order to limit mechanical stresses, a single bed of hydride powder at the bottom of the container was not viable.

Moreover, the article "A study on wall stresses induced by $LaNi_5$ alloy hydrogen absorption-desorption cycles", B. Y. Ao et al, 22 Mar. 2005, Journal of Alloys and Compounds, Volume 390, pages 122-126, the article "Effects of cyclic hydriding-dehydriding reactions of $LaNi_5$ on the thin-wall deformation of metal hydride storage containers with various configuration", C-K. Ling et al, 29 Jun. 2012, Renewable Energy, Volume 48, pages 404-410, and the article "A tool for modelling the breathing of hydride powder in its container while cyclically absorbing and desorbing hydrogen", B. Charlas et al, 8 Jan. 2015, International Journal of Hydrogen Energy, Volume 40, pages 2283-2294, have demonstrated that, in order to limit the mechanical constraints, it is necessary to limit the depth of the hydride powder bed. In particular, for a ratio between depth of the hydride powder bed and width of the hydride powder bed of less than 1, the mechanical stresses remain low.

Furthermore, the patent application US 2012/0160712 A1 describes another example of a hydrogen storage container. Separation elements, provided with a passage for assembly thereof on a pipe, receive a storage material. Sealing elements are disposed between the separation elements and the storage materials. These sealing elements do not make it possible to offer decoupling of functions between: plate for supporting and separating the hydrides; and sealing. The sealing function thus cannot be adjusted. In addition, the solution proposed here is complex, expensive and ineffective.

There thus also exists a need for improving the design of the hydride containers in the form of vertical cylinders involving in particular the vertical separation of said hydride powder bed into a plurality of shallow hydride beds.

DISCLOSURE OF THE INVENTION

The aim of the invention is to at least partially remedy the requirements mentioned above and the drawbacks relating to the embodiments of the prior art.

The invention aims in particular to propose a novel design of a hydrogen storage container, in particular a hydride container in the form of a vertical cylinder, which is simple and practical so as to make assembly easy.

The subject matter of the invention is thus, according to one of the aspects thereof, a container for the storage of hydrogen by absorption of the hydrogen in a hydrogen-storage material, comprising:
 a shell with a longitudinal axis closed at both longitudinal ends thereof,
 a hydrogen supply and collection pipe extending along the longitudinal axis,
 a stack of a plurality of separation elements along the longitudinal axis, each separation element comprising a passage for mounting the separation element around the pipe, and each separation element forming a base substantially perpendicular to the longitudinal axis receiving a hydrogen-storage material so as to form a plurality of beds of hydrogen-storage material.

Preferentially, the largest transverse dimension, that is to say the largest dimension along the transverse axis perpendicular to the longitudinal axis, of the separation elements is less than the largest transverse dimension of the internal volume of the shell in which the pipe, the separation elements and the hydrogen-storage materials are situated.

In addition, preferentially again, the container comprises a plurality of seals, each seal being associated with a separation element, each seal extending over the entire periphery of the corresponding separation element and in contact with the shell, in the space formed between the separation element and the shell because of the difference in the largest transverse dimension.

Advantageously, each seal provides the necessary sealing between the corresponding separation element and the shell in order to prevent any storage material, in particular hydride powder, being able to pass through a bed of storage material, in other words not being able to pass to a lower stage in the storage container.

Unlike the solutions in the prior art, and in particular the solution in US 2012/0160712 A1, the invention allows decoupling of the functions between the hydride support and separation plate and the seal. This makes it possible to adjust the sealing function. In addition, the solution proposed is simple, inexpensive and effective.

The hydrogen storage container according to the invention can further comprise one or more of the following features taken in isolation or in any technically possible combinations.

Preferentially, the separation elements are regularly spaced apart from each other along the hydrogen supply and collection pipe.

Preferentially also, the shell is cylindrical in shape. In addition, the longitudinal axis of the shell preferentially corresponds to a vertical axis so that the shell is preferentially in the form of a vertical cylinder.

The separation elements are advantageously mounted sealingly on the hydrogen supply and collection pipe. The separation elements can in particular be mounted clamped on the pipe, for example by brazing, welding, adhesive bonding, force-fitting or the like. The separation elements may also be formed in a single piece with the pipe.

Each seal may for example be produced from rubber, for example fluorocarbon rubber (FKM), also known as Viton®, which withstands high temperatures. More generally, each seal may be produced from a polymer material, the elasticity of which is sufficient not to be degraded on assembly, which does not cause pollution harmful to the functioning of the storage material, in particular the hydrides, and which is compatible with the presence of hydrogen, or in other words which offers stability under hydrogen.

Each seal is advantageously secured to the corresponding separation element.

Each seal may comprise a main portion extending longitudinally in contact with the longitudinal edge of the separation element.

Each seal may in particular comprise a first portion and a second portion extending transversely towards the pipe on either side of the corresponding separation element from the main portion of the seal.

In addition, each seal may comprise a third portion forming a lip extending transversely towards the shell from the main portion of the seal in contact with the shell.

According to an example embodiment, the third portion of the seal may extend transversely towards the shell from the main portion of the seal substantially transversely in line with the first portion and/or the second portion.

According to another example embodiment, the third portion of the seal may extend transversely towards the shell from the main portion of the seal substantially halfway between the first and second portions. In this way, it is possible to form a seal with a central lip. The advantage of such a seal with a central lip is obtaining better equilibrium with respect to the separation element on which it is installed.

Each seal may also comprise a third portion forming a lip and a fourth portion forming a lip each extending transversely towards the shell from the main portion of the seal in contact with the shell, the third portion extending substantially transversely in line with the first portion and the fourth portion extending substantially transversely in line with the second portion. In this way, it is possible to form a seal with a double lip. The advantage of such a seal with a double lip is obtaining better equilibrium with respect to the separation element on which it is installed, as well as a better seal since there is then a double barrier to be passed. However, the manufacturing cost is higher.

The lip or lips of the seal, in particular the third portion and/or the fourth portion, preferentially have a certain flexibility so as to fit well and to be prestressed with the shell. Thus, advantageously, the ratio L/t between the transverse dimension (L), or length, of the lip to the longitudinal dimension (t), or thickness, of the lip is between 2 and 4. This is because a smaller ratio L/t, that is to say strictly less than 2, would involve an excessively rigid seal that might for example not be able to adapt to the lack of circularity fairly frequently encountered in metal fabrication for a type of shell in a cylindrical shape. In addition, a higher L/t ratio, that is to say strictly greater than 4, would mean having one or more lips with a lack of mechanical strength so that they would risk wrinkling and revealing areas of non-contact with the shell.

Moreover, each separation element may be in the form of a disc or plate, and each seal may be in the form of a ring disposed around the associated disc.

In addition, the largest transverse dimension of each seal is advantageously greater than the largest transverse dimension of the internal volume of the shell. Thus, advantageously, the seal is mounted so as to be prestressed in the shell. More precisely, when the seal is introduced into the shell, the lip or lips of the seal curve up towards the top of the container and naturally apply a pressure against the internal wall of the shell, which provides a good seal.

Furthermore, the distance, or the longitudinal space, between two successive separation elements along the longitudinal axis may be less than the largest transverse dimension of the internal volume of the shell.

In this way, it is possible to obtain beds of storage material that are not too slender longitudinally, in particular vertically. In other words, the thickness of the beds of storage materials can be controlled.

Thus the ratio between the distance between two successive separation elements and the largest transverse dimension of the internal volume of the shell may be strictly less than 1. This value may be refined by taking in particular stress-increase measures for beds of storage materials with different degrees of slenderness, in particular because not each storage material, in particular each hydride, has the same behaviour in cycling.

Moreover, the hydrogen supply and collection pipe may be porous or may advantageously comprise a plurality of hydrogen-passage orifices, for example produced by piercing, in particular at least one hydrogen-passage orifice at each stage of the container formed between two successive separation elements.

In addition, the hydrogen supply and collection pipe may advantageously comprise a plurality of filters disposed against the pipe, each filter being facing at least one hydrogen-passage orifice, the pipe comprising in particular at least one filter disposed against at least one hydrogen-passage orifice formed on the pipe at each stage of the container formed between two successive separation elements.

Advantageously, the presence of a filter covering at least one hydrogen-passage orifice makes it possible to prevent the storage material, in particular in the form of hydride powder, being able to escape through the pipe.

The filters may for example comprise a fabric or felt with a fine mesh. The filters may also comprise a metallic and/or a polymer material, or even any other type of material. The filters may then be wound around the pipe. In order to obtain a good seal, more than one winding of the filter in the form of a fabric or felt around the pipe may be effected.

Moreover, each filter can be held against the pipe by clamping means, in particular clamping collars. Such clamping collars may for example be clamping collars of the Serflex or Colson type.

Furthermore, the hydrogen-storage material may preferentially comprise hydrides, in particular metallic hydrides.

Moreover, another subject matter of the invention, according to another of the aspects thereof, is a method for manufacturing a hydrogen storage container as defined previously, characterised in that it comprises the following steps:

optional placing of hydrogen-storage material in the bottom of the shell of the container, placing of hydrogen-storage material on each separation element, the assembly formed by the hydrogen supply and collection pipe, the separation elements and the seals being mounted prior to the placing of the hydrogen-storage material, each separation element being in particular introduced into the shell at the end of the placing of hydrogen-storage material on this separation element.

The hydrogen-storage container and the manufacturing method according to the invention may comprise any of the features stated in the description, taken in isolation or according to all technically possible combinations with other features.

BRIEF DESCRIPTION OF THE DRAWINGS

The invention can be best understood from a reading of the following detailed description of non-limitative example embodiments thereof, as well as from an examination of the schematic and partial figures of the accompanying drawing, on which.

In all these figures, identical references can designate identical or similar elements.

In addition, the various parts shown in the figures are not necessarily shown to a uniform scale, in order to make the figures more legible.

DETAILED DISCLOSURE OF PARTICULAR EMBODIMENTS

It is stated that, in the following description of particular example embodiments of the invention, the hydrogen-storage material is hydrides, in particular metallic hydrides. In addition, the hydrogen-storage container described has a cylindrical shape of revolution. Nevertheless, any container formed by a hollow element having a longitudinal dimension greater than its transverse direction, and having any cross section, for example circular or polygonal or ellipsoidal, does not depart from the scope of the present invention.

It should also be noted that, in the example embodiments described below, the filters 11 used are felts made from polymer material and the clamping collars 12 are of the Colson type. Naturally, these choices are in no way limitative.

Figure 1:
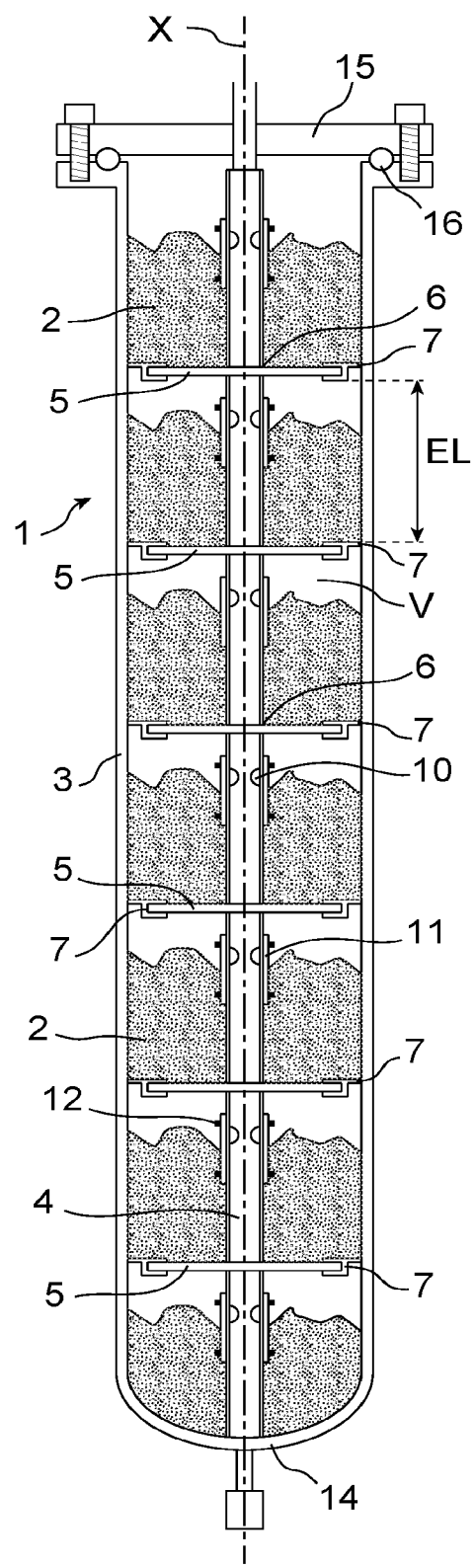
FIG. 1 is a schematic view in cross section of an example embodiment of a hydrogen-storage container according to the invention.
Figure 2:
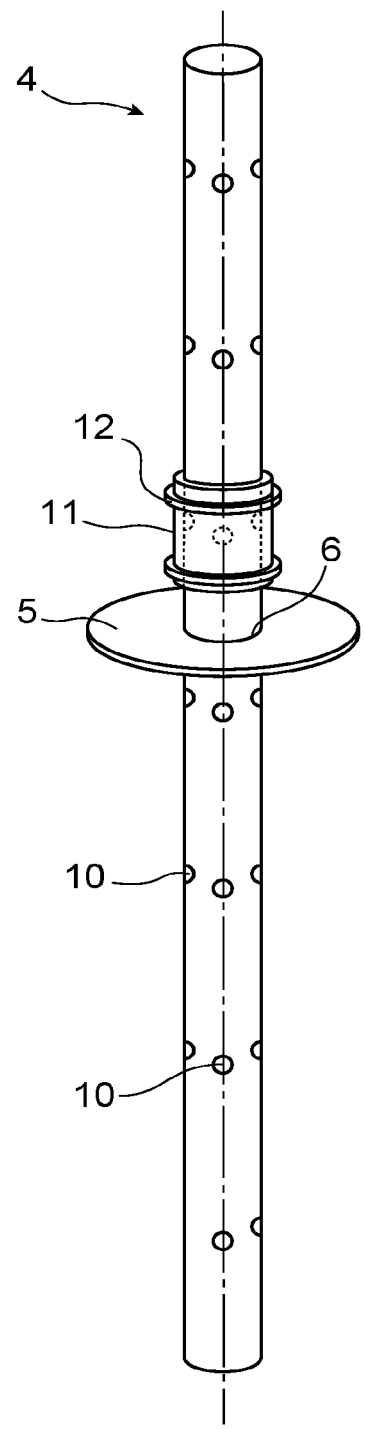
FIG. 2 is a schematic perspective view showing in isolation the hydrogen supply and connection pipe of the hydrogen-storage container in FIG. 1.
Figure 3:
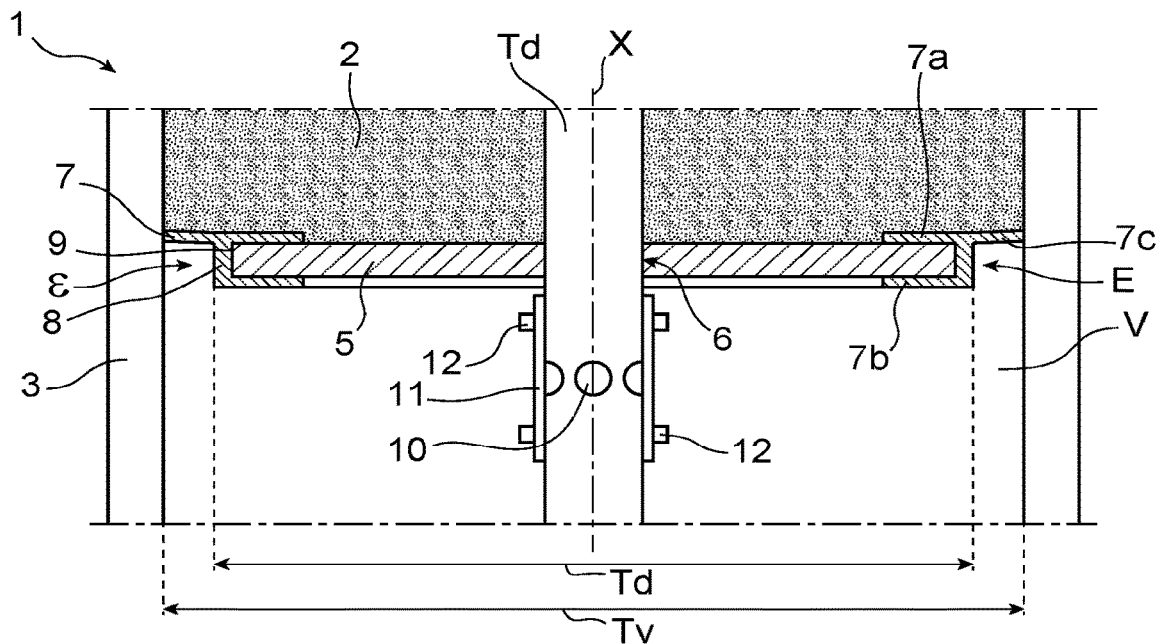
FIG. 3 is an enlarged view of part of FIG. 1 showing a detail of the design of the hydrogen-storage container in FIG. 1.

With reference to FIGS. 1 to 3, these show an example embodiment of a container 1 for the storage of hydrogen by absorption of the hydrogen in a hydrogen-storage material 2.

In FIG. 1, this example of a storage container 1 can be seen, shown schematically.

The container 1 comprises a shell, or barrel 3, with a longitudinal axis X, closed off at a bottom end by a bottom base 14. The container 1 also comprises a top wall 15 provided with an O-ring seal 16 closing the top end of the barrel 3.

The container 1 is intended to be generally oriented so that the longitudinal axis X is substantially aligned with the direction of the gravity vector. However, during use thereof, for example in the case of a use on board, its orientation may change.

The container 1 comprises hydrogen supply and collection means comprising in particular a hydrogen supply and collection pipe 4 extending along the longitudinal axis X from the bottom base 14 towards the top wall 15.

The pipe 4 is for example connected to a hydrogen supply and collection circuit, for example at one of the longitudinal ends thereof.

As will be explained below, the inside of the container 1 is divided into a plurality of stages along the longitudinal axis X and each stage comprises storage material 2. These stages are produced so that they prevent the passage of the storage material, in particular in the form of hydride powder, from one stage to another, thus preventing the accumulation of powder in one stage, in particular in the lower stages, and the appearance of pressure stresses on the internal wall of the barrel 3.

Thus the container 1 comprises a stack of a plurality of separation elements 5 along the longitudinal axis X, regularly spaced apart from each other along the hydrogen supply and collection pipe 4. These separation elements 5 are mounted on the pipe 4 sealingly, for example by brazing, welding, adhesive bonding or force-fitting, or be formed in a single piece with the pipe 4. In addition, these separation elements 5 are here in the form of a discs 5.

Each disc 5 comprises a passage 6, or central orifice, which enables the disc 5 to be mounted around the pipe 4. In addition, each disc 5 defines a base perpendicular to the longitudinal axis X on which hydride powder is deposited when the container 1 is manufactured in order to form a plurality of hydride-powder stages or beds.

The discs 5 are mounted on the pipe 4 so that the longitudinal space EL between two successive discs 5 is less than the inside diameter Tv of the internal volume V of the barrel 3. Thus the thickness of the hydride powder beds can be controlled. In other words, the ratio EL/Tv is strictly less than 1.

Moreover, as can be seen in FIG. 3, the diameter Td of the discs 5 is less than the inside diameter Tv of the barrel 3 so that a space E exists between each disc 5 and the barrel 3.

Advantageously, the container 1 then comprises a plurality of seals 7 each associated with a disc 5, in the form of rings, and extending over the entire periphery of the corresponding disc 5. Each seal 7 is also situated in the space E formed between the corresponding disc 5 and the barrel 3.

Each seal 7 is for example produced from rubber, for example fluorocarbon rubber (FKM), also known as Viton®.

Figure 4:
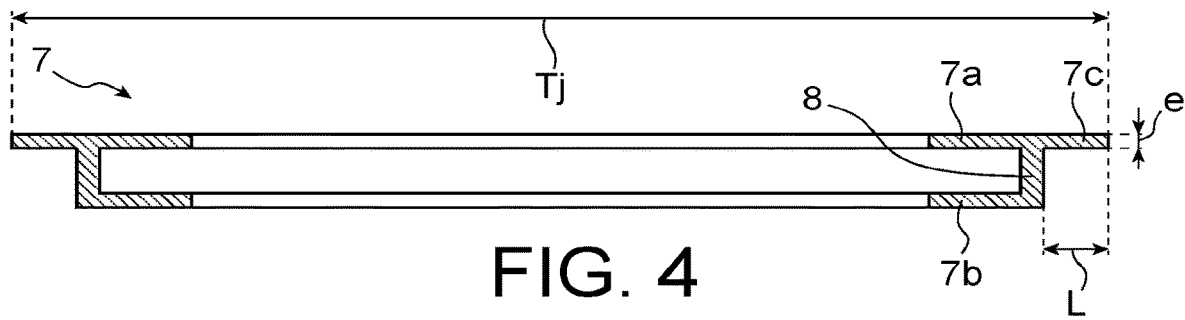
FIG. 4 is a schematic view in cross section of a seal used in the hydrogen-storage container in FIG. 1, and FIGS. 5 and 6 are schematic views in cross section showing variant embodiments of the seal in FIG. 4.

Advantageously, each seal 7 is secured to the disc 5 with which it is associated. As can be seen in FIGS. 3 and 4, each seal 7 comprises a main portion 8 extending longitudinally in contact with the longitudinal edge 9 of the disc 5. In addition, the seal 7 comprises a first portion 7a and a second portion 7b extending transversely towards the pipe 4 on either side of the disc 5 from the main portion 8.

In the example in FIGS. 3 and 4, the seal 7 comprises a third portion 7c forming a lip extending transversely towards the barrel 3 from the main portion 8 of the seal 7 in contact with the barrel 3, the transverse extent of this third portion 7c lying transversely in line with the first portion 7a.

Figure 6:
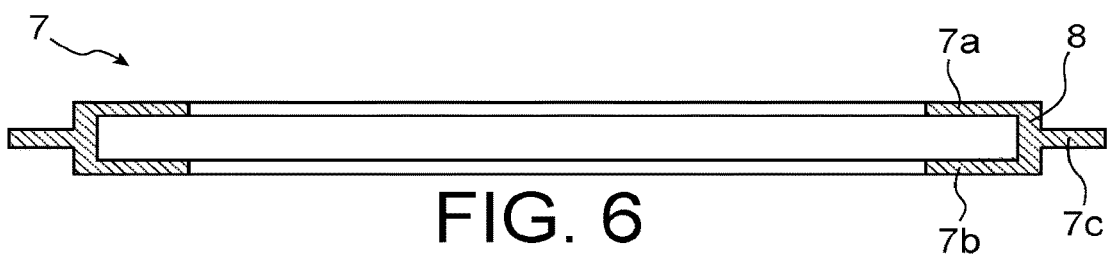

On the other hand, in the example in FIG. 6, which is a variant embodiment of FIG. 4, the third portion 7c of the seal 7 extends transversely towards the barrel 3 from the main portion 8 halfway between the first 7a and second 7b portions. In this way, it is possible to form a seal 7 of the so-called central lip type having the advantage of better equilibrium with respect to the disc 5 on which it is installed.

Figure 5:
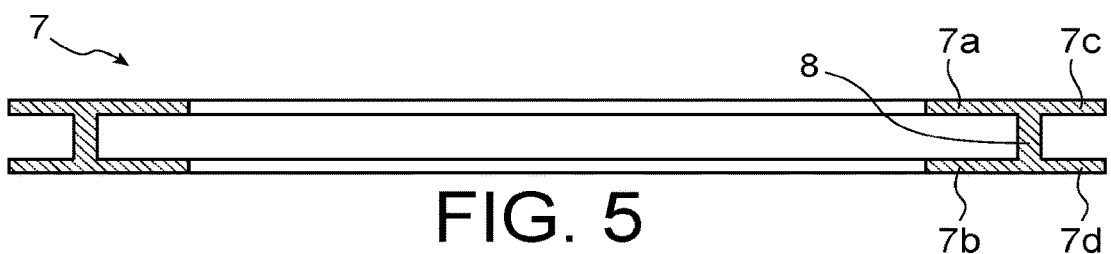

In another variant of FIGS. 4 and 6, the example embodiment in FIG. 5 shows that the seal 7 comprises a third portion 7c forming a lip and a fourth portion 7d forming a lip each extending transversely towards the barrel 3 from the main portion 8 in contact with the barrel 3, the third portion 7c extending transversely in line with the first portion 7a and the fourth portion 7d extending transversely in line with the second portion 7b. Then it is possible to form a so-called double lip seal 7 also having the advantage of better equilibrium with respect to the discs 5 on which it is installed, as well as a better seal since there is then a double barrier to be passed.

Preferentially, as can be seen in FIG. 4, the ratio L/t between the length L of a lip 7c or 7d to the thickness t of the lip is between 2 and 4. This is because a lower ratio L/t, that is to say strictly less than 2, would involve an excessively rigid seal 7 that might for example not to be able to adapt to any defect in circularity fairly frequently encountered in metal fabrication for this type of cylindrical barrel 3. In addition, a higher ratio L/t, that is to say strictly greater than 4, would involve having one or more lips with a lack of mechanical strength so that they would risk revealing zones of non-contact with the barrel 3.

Moreover, it should be noted that the diameter Tj of each seal 7, visible in FIG. 4, is greater than the inside diameter Tv of the barrel 3. Thus, advantageously, the seal 7 is mounted so as to be prestressed in the barrel 3. More precisely, when the seal 7 is introduced into the barrel 3, the lip or lips 7c, 7d of the seal 7 curve towards the top of the container 1 and naturally apply a pressure against the internal wall of the barrel 3, which provides a good seal.

Furthermore, as can be seen in FIG. 2, the pipe 4 advantageously comprises a plurality of orifices 10, or holes 10, for the passage of hydrogen, for example produced by piercing. More precisely, each stage of the container 1 comprises a plurality of orifices 10 at the pipe 4.

The pipe 4 then advantageously comprises a filter 11 at each stage in order to cover the hydrogen-passage orifices 10.

These filters 11 make it possible to prevent the hydride powder 2 being able to escape through the pipe 4. They may for example be produced from fabric or felt with a fine mesh, comprising for example a metallic and/or polymer material. In order to obtain a good seal, the filters in this form are wound more than one time around the pipe 4.

Moreover, in order to afford good holding of the filters 11 on the pipe 4 once the winding has ended, clamping collars 12 may be used, as can be seen in FIG. 3, for example of the Colson type.

Naturally the invention is not limited to the example embodiments that have just been described. Various modifications can be made thereto by a person skilled in the art.

The invention claimed is:

1. A container for the storage of hydrogen by absorption of the hydrogen in a hydrogen-storage material, comprising:
    a shell with a longitudinal axis closed at both longitudinal ends;
    a hydrogen supply and collection pipe extending along the longitudinal axis, comprising a plurality of hydrogen-passage orifices;
    a stack of a plurality of separation elements along the longitudinal axis, each separation element comprising a passage for mounting the separation element around the pipe, and each separation element forming a base substantially perpendicular to the longitudinal axis receiving a hydrogen-storage material so as to form a plurality of beds of hydrogen-storage material,
    wherein the largest transverse dimension of the separation elements is less than the largest transverse dimension of the internal volume of the shell in which the pipe, the separation elements and the hydrogen-storage materials are situated,
    wherein the container comprises a plurality of seals, each seal being associated with a separation element, each seal extending over the entire periphery of the corresponding separation element and in contact with the shell, in the space formed between the separation element and the shell because of the difference in the largest transverse dimension,
    wherein each seal comprises a main portion extending longitudinally in contact with the longitudinal edge of the separation element, and
    wherein each seal further comprises a first portion and a second portion extending transversely towards the pipe on either side of the corresponding separation element from the main portion of the seal.

2. The container according to claim 1, wherein each seal is secured to the corresponding separation element.

3. The container according to claim 1, wherein each seal comprises a third portion forming a lip extending transversely towards the shell from the main portion of the seal in contact with the shell.

4. The container according to claim 3, wherein the third portion of the seal extends transversely towards the shell from the main portion of the seal transversely in line with the first portion and/or the second portion.

5. The container according to claim 3, wherein the third portion of the seal extends transversely towards the shell from the main portion of the seal halfway between the first and second portions.

6. The container according to claim 3, wherein each seal comprises a third portion forming a lip and a fourth portion forming a lip each extending transversely towards the shell from the main portion of the seal in contact with the shell, the third portion extending transversely in line with the first portion and the fourth portion extending transversely in line with the second portion.

7. The container according to claim 1, wherein each separation element is in the form of a disc, and wherein each seal is in the form of a ring disposed around the associated disc.

8. The container according to claim 3, wherein the largest transverse dimension of each seal is larger than the largest transverse dimension of the internal volume of the shell.

9. The container according to claim 1, wherein the distance between two successive separation elements along the longitudinal axis is less than the largest transverse dimension of the internal volume of the shell.

10. The container according to claim 1, wherein the hydrogen supply and collection pipe comprises at least one hydrogen-passage orifice at each stage of the container formed between two successive separation elements.

11. The container according to claim 1, wherein the hydrogen supply and collection pipe comprises a plurality of filters disposed against the pipe, each filter being facing at least hydrogen-passage orifice, the pipe comprising at least one filter disposed against at least one hydrogen-passage orifice formed on the pipe at each stage of the container formed between two successive separation elements.

12. The container according to claim 11, wherein each filter is held against the pipe by clamping means.

13. The container according to claim 1, wherein the hydrogen-storage material comprises hydrides.

14. A method for manufacturing a hydrogen storage container according to claim 1, comprising:
    placing of hydrogen-storage material in the bottom of the shell of the container; and
    placing of hydrogen-storage material on each separation element,
    wherein the assembly formed by the hydrogen supply and collection pipe, the separation elements and the seals are mounted prior to the placing of the hydrogen-storage material, and
    wherein each separation element is introduced into the shell at the end of the placing of hydrogen-storage material on the separation element.

* * * * *